March 5, 1957 W. O. BOURASSA 2,783,622
AIR CONDITIONER FOR AUTOMOTIVE VEHICLES
Filed Aug. 12, 1954
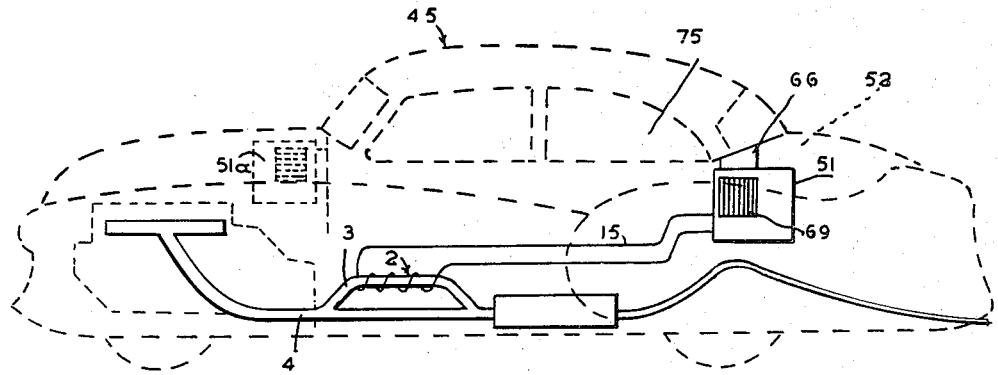
FIG. 1.
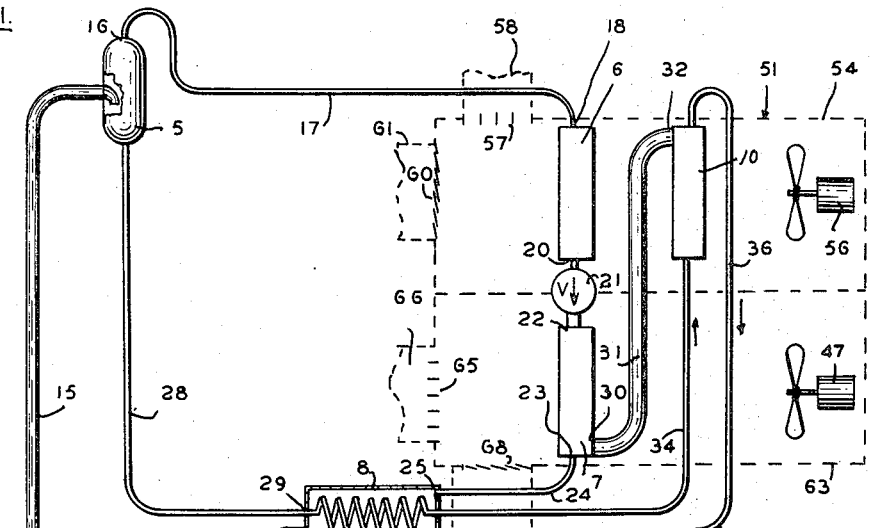
FIG. 2. FIG. 3.
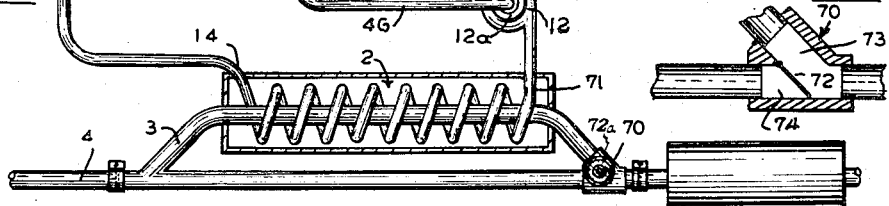
FIG. 4
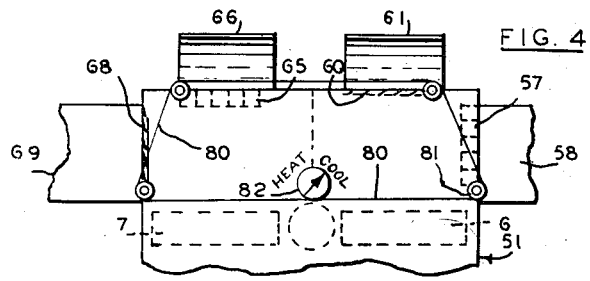
*INVENTOR.*
WILBUR O. BOURASSA
BY *Scott L. Norvied*
*Atty.*

United States Patent Office 2,783,622
Patented Mar. 5, 1957

2,783,622
AIR CONDITIONER FOR AUTOMOTIVE VEHICLES

Wilbur O. Bourassa, Lancaster, Calif.

Application August 12, 1954, Serial No. 449,290

2 Claims. (Cl. 62—119)

This invention concerns an air conditioner for automotive vehicles having internal combustion engines.

One of the objects of the invention is to provide a light weight, easily constructed and efficient air cooler of the refrigerant absorption type which, by reason of a low volume absorbent, is adapted to installation in the body of a conventional automobile, and which will derive refrigeration or heat from the heat of the exhaust gases of the internal combustion engine which drives said automobile;

Another object is to provide a refrigerated air cooler for automobiles which is easily and cheaply made and will operate from waste engine exhaust heat and which uses a non-toxic refrigerant and absorbent and operates on less than atmospheric pressures.

A further object is to provide a refrigerant type air conditioner, as above stated, which may be used to derive heat from the atmosphere by reversal of the refrigerating elements.

Another object is to provide an efficient method of heating the refrigerant absorber from the engine exhaust which can be accurately and automatically controlled.

Other objects will appear hereinafter.

I attain the foregoing objects by means of the devices, elements, parts and arrangement of parts, and methods hereinafter explained and illustrated in the accompanying drawings in which—

Figure 1 is a semi-diagrammatic view of the entire device installed in an automobile;

Figure 2 is a schematic diagram of the operating parts drawn on an enlarged scale, and with portions of the outer surfaces of some of the parts broken away to show the interior thereof;

Figure 3 is an elevational mid-sectional view of the muffler heat control valve, drawn on an enlarged scale; and Figure 4 is a plan view of the forepart of the case containing the refrigerating and cooling devices.

Similar numerals refer to similar parts in the several views.

The air conditioner consists generally of a generator 2 which is a helical coil of metal tubing wrapped around by-pass 3 of exhaust pipe 4; a separator 5 which is a hollow cylinder closed at each end; an air cooled condenser 6 composed of lengths of tubing connected by return bends, and included between metal strips comprising fins; an evaporator 7 which is made the same as the condenser and also includes a bank of finned tubing; a heat exchanger 8 consisting of a closed cylinder or shell wherein a coil of tubing 9, which is included in the return line from the separator, is enclosed; an absorber 10 which is a finned bank of return bend tubes similar in structure to the condenser; and a power driven pump 12.

These parts are interconnected as follows:

The outlet 14 from the generator goes through tubing 15 to the inlet of the separator 5 where it enters through the side of the vertically positioned cylindrical separator body. The refrigerant outlet 16 is at the top of the separator body and connects to the refrigerant line tubing 17 which leads to the inlet 18 of the condenser 6.

The outlet 20 from the condenser goes through an expansion orifice 21, of predetermined size to the inlet 22 of evaporator or cooling coil 7. The outlet 23 from the cooling coil is then led through pipe 24 to the inlet 25 of heat exchanger 8. The outlet 26 from the heat exchanger goes to the absorbent circulation pump 12.

From the bottom of separator 5 an absorbent outlet 27 connects through tube 28 to the inlet end 29 of heat exchanger coil 9.

A vapor outlet 30 connects to vapor tube 31 which leads from the bottom of evaporator 7 to vapor inlet 32 of the absorber 10. The absorbent passes to the absorber 10 from heat exchanger 8 through tube 34 and returns through tube 36 to the heat exchanger.

Lastly the discharge of pump 12 is connected through pipe 71 to the inlet of generator 2.

The tubing above mentioned may be of flexible rubber or composition vacuum hose. The piping is preferably metal. The entire system is closed and is placed under partial vacuum. Pressure within the system is initially reduced to approximately 2 mm. of mercury.

A mixture of approximately 60 percent water and 40 percent lithium bromide is introduced into the helical tube of generator 2, where it is heated by by-pass pipe 3. This solution then flows into separator 5. Here most of the water, which is the refrigerant, is separated from the solution of lithium bromide, which is the absorbent, and the water in the form of vapor flows through line 17 to the condenser 6. Here the water vapor is cooled by action of condensing fan 56, and liquefies. A concentrated solution of lithium bromide then returns through tube 28 to the helical coil 9 of heat exchanger 8.

Due to pressure differential water from condenser 6 expands into evaporator 7 through orifice valve 21. Refrigeration produced by this expansion is conveyed to the interior compartment 73 of the automobile (indicated by dotted outline 45) by circulating fan 47.

Cooled and condensed water then flows in part through tube 24 to the shell of heat exchanger 8 where it cools coiled tube 9. Another part of the water vapor flows through pipe 31 to absorber 10. Here it is mixed with cooled concentrated lithium bromide solution which enters through tube 34 and which immediately absorbs it and reduces the pressure in this portion of the system. The absorbent solution is then drawn through tube 36 by pump 12 to heat exchanger 8, where it absorbs heat from coiled tubing 9, and mingles with condensed water from tube 24, and then flows through outlet 26 and pipe 46 to the inlet of pump 12, by which it is again forced back into generator 2.

As shown in Figure 1, most of the apparatus is incorporated in a case 51 placed in the trunk compartment 52 of the automobile 45. Optionally this case may be placed in the engine compartment as indicated at 51a. The condenser 6 and absorber 10 are placed in compartment 54 of case 51 and are cooled by an air draft from fan 56, termed the condenser fan, which draws atmospheric air into the compartment, forces it over the absorber 10 and condenser 6, and then out through a louver type spill damper 57 to a duct 58 which opens to the outside air. When desired, this damper may be closed and damper 60 opened. This damper opens, through a short duct 61, into the interior of the automobile, and provides heat.

A second compartment 63 in case 51 includes circulation fan 47 and the evaporator 7. A draft of air from the circulating fan flows over and through the evaporator and through cold air louver damper 65 into the interior compartment 75 of the car through duct 66 when cooling is desired. When the car is to be heated this damper is closed and the cooled air discharged through spill damper 68 into discharge duct 69 which opens to the outer air.

Both fans 47 and 56 are driven by electric motors connected to the electrical system of the automobile. Pump 12 is similarly driven by an electric motor 12a.

The amount of heat supplied generator 2 is regulated by a heat control damper 70 placed at the junction of the by-pass 3 and exhaust pipe 4. This damper 70 has a flapper valve 72 which will hinge upward and cover the opening 73 into the by-pass, thus cutting off circulation through the by-pass, or will hinge downward and close the exhaust pipe at 74 thus forcing all exhaust gases through the by-pass. Valve 72 may be operated by bi-metal thermostat 72a or control of this valve, as well as dampers 58, 60, 65 and 68 may be had by suitable links, levers, cables and pull wires operated by knobs (not shown) in the driving compartment of the automobile. In Figure 4 the front portion of the top face of case 51 is shown in detail. The dampers above mentioned consist of a bank or group of vertical parallel slats pivoted at each end. A link joins their free ends so that they turn in unison. A pulley 81 is attached to the upper end of one of the pivots of each damper group to afford means for opening and closing all the slots of the group. The dampers are shown positioned for cooling the interior driving compartment 75 of automobile 45. A light steel cable 80 runs around the four pulleys 81 which are each attached respectively to one of the shafts of each of the louver dampers, and also around control pulley 82. Turning the control pulley counter-clockwise from the position shown will rotate pulley 81 on spill damper 68 and open this damper, and likewise close cool air damper 65, open hot air damper 60, and close spill damper 57. Air heated from contact with the condenser 6 and absorber 10 will then enter compartment 75.

The generator and its by-pass pipe may be conveniently installed by removing a section of the original exhaust pipe 4 then fitting the unit composed of by-pass 3 and generator 2 in the spaces previously occupied by the removed section. The ends of by-pass 3 can then be attached to pipe 4 by clamping sleeves.

In the form here shown, the unit 51 is located in the forward portion of the trunk compartment 52 and the ducts 61 and 66 opened into the interior compartment 75 through the body wall just to the rear of the back of the rear seat. This is only one example of installation, however, and when the case is located at 51a in the engine compartment the ducts are brought through the dash and fire wall of the body.

While a solution of lithium bromide has been specified as an absorbent and a portion of the water of the solution as the evaporative refrigerant liquid, it is to be understood that other fluid absorbents may be substituted.

Operating the system under less than atmospheric pressure is a distinct advantage, and makes possible the use of flexible hose for many of the pipe connections. Thus the system is not only particularly adapted to installation in automobiles, but may be efficiently installed in airplanes and many other types of automotive vehicles.

I claim:

1. In refrigeration apparatus for conditioning air within the body of an automobile having an internal combustion engine with an exhaust pipe, an interior driving compartment within said body, and a compartment separated from said driving compartment, in combination, a generator disposed beneath said body containing a water solution of lithium bromide in heat exchange relation to said vehicle exhaust pipe, discharging said solution, after heating, into a separator, a condenser above said separator receiving water vapor from said separator, a power driven air fan forcing a draft of cooling air over said condenser, an evaporator, an expansion valve connecting said condenser to said evaporator, a power driven air fan directing a draft of atmospheric air over said evaporator into the driving compartment of said vehicle, a heat exchanger having an enclosing shell and an inner coiled tube receiving hot concentrated solution from said separator and bringing it into thermal relation with cooled liquid in said enclosing shell flowing from said evaporator, an absorber receiving water vapor from said evaporator and bringing it into contact with a cooled concentrated solution of lithium bromide from said heat exchanger coiled tube and forming a diluted solution, a tube connecting said absorber to the shell of said heat exchanger, and a power driven pump drawing liquid from the shell of said heat exchanger and forcing said liquid into said generator, and from said generator into said separator, a case positioned adjacent said driving compartment having a partition dividing it into two transversely disposed laterally extending compartments, each compartment of said case having a duct opening into said vehicle body driving compartment and a duct opening outward to the atmosphere, and a power driven fan in each of said compartments forcing a draft of air therethrough; said condenser and absorber being disposed in one of said compartments, and said evaporator being disposed in the other compartment, and dampers adapted to alternately open and close said ducts leading into said automobile driving compartments, and at the same time alternately opening and closing the ducts opening to the atmosphere, so that when the duct of one compartment is opened to said driving compartment, its duct leading to the atmosphere is closed, and the duct of the other compartment leading to the driving compartment is closed while its duct leading to the atmosphere is open, together with means for simultaneously operating said dampers so that when cooling is desired the case compartment containing the evaporator is opened to the automobile body driving compartment only, and the compartment containing the condenser and absorber is open to the outer air only, and when heating is desired, the case compartment containing the condenser and absorber will be open to the automobile body driving compartment only and the case compartment containing the evaporator will be open to the atmosphere only.

2. The device described in claim 1, wherein each of the four dampers consists of shutter slats pivoted at each end and connected to operate in unison, and pulleys attached to one of the shutter slats of each group operatively connected by a cable so that all damper slats open and close in unison, as desired.

References Cited in the file of this patent

UNITED STATES PATENTS

| | | |
|---|---|---|
| 967,992 | Starr | Aug. 23, 1910 |
| 1,806,712 | Schulman | May 22, 1931 |
| 1,985,636 | Foss | Dec. 25, 1934 |
| 2,094,221 | Shaller | Sept. 28, 1937 |
| 2,127,993 | Crawford | Aug. 23, 1938 |
| 2,142,960 | Zellhoefer | Jan. 3, 1939 |
| 2,187,982 | Moncrief | Jan. 23, 1940 |
| 2,354,884 | Sherwood | Aug. 1, 1944 |
| 2,494,972 | Thomas | Jan. 17, 1950 |
| 2,548,508 | Wolfner | Apr. 10, 1951 |
| 2,559,217 | Kehoe | July 3, 1951 |
| 2,599,428 | Berestneff | Jan. 3, 1952 |
| 2,610,481 | Whitlow | Sept. 16, 1952 |
| 2,713,778 | Berry | July 26, 1955 |